(12) United States Patent
Baiada et al.

(10) Patent No.: US 9,682,371 B2
(45) Date of Patent: Jun. 20, 2017

(54) REMOVAL OF COMPONENTS FROM A STARTING MATERIAL

(71) Applicant: European Sugar Holdings s.a.r.l., Capellen (LU)

(72) Inventors: Anthony Baiada, London (GB); Tommaso Bartalucci, London (GB); John Kerr, London (GB); Tim Windebank, London (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 414 days.

(21) Appl. No.: 14/367,225

(22) PCT Filed: Dec. 18, 2012

(86) PCT No.: PCT/GB2012/053168
§ 371 (c)(1),
(2) Date: Jun. 19, 2014

(87) PCT Pub. No.: WO2013/093444
PCT Pub. Date: Jun. 27, 2013

(65) Prior Publication Data
US 2014/0326924 A1 Nov. 6, 2014

(30) Foreign Application Priority Data
Dec. 19, 2011 (GB) .................. 1121950.8

(51) Int. Cl.
*B01D 24/46* (2006.01)
*B01D 36/00* (2006.01)
(Continued)

(52) U.S. Cl.
CPC ........... *B01J 49/0065* (2013.01); *B01J 49/50* (2017.01); *C02F 9/00* (2013.01); *C02F 1/24* (2013.01);
(Continued)

(58) Field of Classification Search
CPC ........ B01D 24/46; B01D 36/00; B01D 41/03; B01D 61/04; B01D 61/142; B01D 61/146;
(Continued)

(56) References Cited

U.S. PATENT DOCUMENTS 2,413,784 A * 1/1947 Rawlings .............. C13B 20/144
127/46.2
3,248,324 A * 4/1966 Sweeney .................. C02F 1/24
210/608

(Continued)

FOREIGN PATENT DOCUMENTS

GB 1369381 A 10/1974
GB 1591595 A 6/1981
(Continued)

OTHER PUBLICATIONS

Combined Search and Examination Report Under Sections 17 and 18(3); Jan. 31, 2013.
(Continued)

*Primary Examiner* — Joseph Drodge
(74) *Attorney, Agent, or Firm* — Williams Morgan, P.C.

(57) ABSTRACT

The present invention relates to a process and, more specifically, to a process for the removal of components from a starting material. Optionally, the process is used for the removal of contaminants from ion exchange regenerant material.

18 Claims, 9 Drawing Sheets

(51) Int. Cl.

| | | |
|---|---|---|
| *B01D 61/58* | (2006.01) | |
| *C02F 1/24* | (2006.01) | |
| *C02F 1/44* | (2006.01) | |
| *C02F 1/66* | (2006.01) | |
| *C02F 1/72* | (2006.01) | |
| *B01J 20/34* | (2006.01) | |
| *B01J 20/30* | (2006.01) | |
| *B01J 49/00* | (2017.01) | |
| *C02F 9/00* | (2006.01) | |
| *B01J 49/50* | (2017.01) | |
| *C02F 1/00* | (2006.01) | |
| *C02F 103/26* | (2006.01) | |
| *C02F 103/32* | (2006.01) | |

(52) U.S. Cl.
CPC ...... *C02F 1/44* (2013.01); *C02F 1/66* (2013.01); *C02F 1/72* (2013.01); *C02F 2001/007* (2013.01); *C02F 2103/26* (2013.01); *C02F 2103/32* (2013.01); *C02F 2209/02* (2013.01); *C02F 2209/06* (2013.01); *C02F 2303/16* (2013.01)

(58) Field of Classification Search
CPC ... B01D 61/20; B01D 61/58; B01D 2311/2634; B01D 2311/2642; B01D 2311/2649; B01D 2311/2653; C02F 1/24; C02F 1/44; C02F 1/441; C02F 1/66; C02F 1/72; C02F 2103/26; C02F 2103/32; C02F 2303/16; C02F 2209/02; C02F 2209/06; C02F 9/00; C02F 1/02; C02F 1/04; C02F 1/52; C02F 1/68; C02F 1/685; B01J 20/30; B01J 20/34; B01J 20/3483; B01J 20/345; B01J 20/3458; B01J 20/3475; B01J 49/00; B01J 49/0065; B01J 20/3071; B01J 20/3425; B01J 20/3433
USPC .... 210/198.1, 259, 513, 638, 641, 702, 703, 210/737, 758, 806; 521/26; 502/20, 25, 502/26, 56

See application file for complete search history.

(56) References Cited

U.S. PATENT DOCUMENTS

| | | | |
|---|---|---|---|
| 3,898,159 A * | 8/1975 | Okabe | C02F 1/24 210/705 |
| 4,137,163 A | 1/1979 | Young | |
| 4,211,645 A | 7/1980 | Zajic et al. | |
| 4,746,440 A * | 5/1988 | Seeger | B01D 17/0205 209/169 |
| 4,770,790 A * | 9/1988 | Oberhofer | B01D 15/00 134/25.1 |
| 4,915,928 A | 4/1990 | Marcantonio | |
| 6,378,703 B1 | 4/2002 | Mathur et al. | |
| 7,799,228 B2 * | 9/2010 | Bornak | B01J 49/0069 210/673 |
| 2001/0035353 A1 | 11/2001 | Stiller | |
| 2002/0020631 A1 | 2/2002 | Gavrel et al. | |
| 2004/0188348 A1 | 9/2004 | Yamasaki et al. | |
| 2006/0157415 A1 * | 7/2006 | Koefod | B01J 49/0078 210/670 |
| 2008/0021124 A1 * | 1/2008 | Vero | B01J 49/0004 521/26 |
| 2010/0101997 A1 * | 4/2010 | Tateishi | B01D 61/027 210/636 |
| 2011/0077144 A1 | 3/2011 | Jessen et al. | |

FOREIGN PATENT DOCUMENTS

| | | |
|---|---|---|
| GB | 1591695 A1 | 6/1981 |
| JP | 59010388 A | 1/1984 |
| JP | 2008073006 A | 4/2008 |
| WO | 2005058760 A1 | 6/2005 |

OTHER PUBLICATIONS

PCT International Search Report and Written Opinion of the International Searching Authority, Mar. 4, 2013.

\* cited by examiner

| Date | Experiment | Chemical Treatment Carried out |
|---|---|---|
| 17/08/2011 | 1 | 450 litres start material. 0.9kg of 81% Phosphoric Acid to pH 4.5. Heated to 50°C and stirred for 15 mins. 1.1 kg solid lime to pH 11. Heated to 80°C for 2 hours, left to settle overnight. Filtered through a 5 µm filter |
| 08/09/2011 | 2 | 300 litres start material, 1 kg solid lime added. Heated to 50°C for 1 hour. 5 kg of Soda Ash added and left for 30 mins. Filtered through a 5 µm filter |
| 18/11/2011 | 3 | 300 litres start material. 1.5 kg of 81% Phosphoric Acid to pH 5.0. Aerated for 1 hour and remove foam produced. 1.2 kg Solid Lime added to pH 10. Heat to 70°C and cooked for 3 hours whilst aerating and removing the foam. Bubbled with 10% $CO_2$ to pH 8.3, left to settle overnight. Filtered through a 5 µm filter. |
| 30/11/2011 | 4 | 400 litres start material. Heated to 75°C, 1.1 kg of 81% Phosphoric Acid to pH 5.4. Aerated for 1 hour with foam removal. 1.1 kg Lime added to pH 9.9, cooked for 2 hours with aeration with 10% $CO_2$ and removing the foam. Left to settle overnight and filtered through a 0.5 µm filter. |

Figure 9

| Experi-ment | Stream | Total Solids (%) | Total Cations (ppm on solids) | Total Anions (ppm on solids) | Colour on Sample | Colour on Solids | Membrane permeate Flow cf. Control at VCF 10, l/min |
|---|---|---|---|---|---|---|---|
| 1 | Start material | 13.8 | 353,024 | 590,340 | 8,492 | 61,626 | 100% |
|  | Final Treated /Filtered Liquid | 14.4 | 357,511 | 458,458 | 5,440 | 37,804 | 140% |
|  | Dried Filtered Solids | 85.9 | 386,629 | 251,002 | 159,662 | 185,805 |  |
| 2 | Start material | 10.5 | 457,117 | 572,939 | 12,734 | 120,701 | 100% |
|  | Final Treated /Filtered Liquid | 11.3 | 319,348 | 501,051 | 11,878 | 105,115 | 65% |
|  | Post lime addition | 11.5 | 348,453 | 507,118 | 10,089 | 87,807 |  |
|  | Post Soda ash addition | 11.6 | 349,730 | 561,300 | 13,210 | 113,683 |  |
| 3 | Start material | 11.8 | 350,250 | 535,280 | 14,648 | 124,133 | 100% |
|  | Final Treated /Filtered Liquid | 9.7 | 366,538 | 631,358 | 7,378 | 75,749 | 105% |
|  | Combined Foam Produced | 11.2 | 428,966 | 562,450 |  |  |  |
|  | Filtered solids | 41.6 | 190,291 | 151,797 |  |  |  |
| 4 | Start material | 11.5 | 369,293 | 662,039 | 10,188 | 88,361 | 100% |
|  | Final Treated /Filtered Liquid | 13.0 | 327,946 | 586,178 | 8,872 | 68,299 | 105% |

REMOVAL OF COMPONENTS FROM A STARTING MATERIAL

TECHNICAL FIELD

The present invention relates to a process and, more specifically, to a process for the removal of components from a starting material. Optionally, the process is used for the removal of contaminants from ion exchange regenerant material.

BACKGROUND

Many processes result in the production of a solution or suspension that contains undesirable constituents or contaminants. It may be desirable to remove a proportion or all of the contaminants in the solution or suspension, to reuse the resultant solution in the same process, to use the resultant solution and/or the contaminants in another process and/or to dispose of them in an appropriate manner. For example, in the textile industry it is advantageous to remove dyes from solutions or suspensions to minimise the environmental impact when disposing of the solution. It may also be desirable to remove contaminants from a solution or suspension in certain sweetener industries, where very salty and highly coloured solutions are also present.

Specifically during sugar refining, it is necessary to remove non-sugar components from the raw sugar. Such non-sugar components include colorants or colour bodies, which are present in the raw sugar when it is extracted from the plant, and further colour bodies that are produced during processing. Other components that may be present in the raw sugar solutions include impurities and fouling agents. The non-sugar components include high molecular weight compounds, such as colloids, waxes and phenolic compounds.

Ion exchange resins can be used to remove the colour bodies, impurities and fouling agents from the sugar solutions. This process is commonly known as decolourisation.

Following the use of ion exchange resins for the decolourisation of sugar solutions, the colour bodies, impurities and other fouling agents may be removed from the resin, to regenerate the ion exchange resin so that it can be used again in decolourisation reactions. A salt solution can be used for the regeneration of ion exchange resins, and the resulting ion exchange regenerant material may have high concentrations of salt and contaminants including colour bodies and non-coloured components.

The ion exchange regenerant material may be disposed of by general waste water disposal, such as by treatment at a sewer plant or an alternative waste water treatment plant. The disposal of the ion exchange regenerant material in this way can present a severe pollution problem. It is therefore of both economic and environmental benefit to reuse as much of the ion exchange regenerant material as possible.

The use of membrane filtration to remove contaminants from waste streams, such as ion exchange regenerant material, is known. However, the ability of membrane filtration to remove the contaminants is dependent on a number of factors, such as pH and temperature. In particular, the concentration of the contaminants in the waste stream can affect the efficiency of the membrane filtration. If the concentration of contaminants is too high, membrane filtration may be inefficient and the membranes may become damaged. Therefore, the use of membrane filtration to remove contaminants is limited to waste streams with sufficiently low levels of contaminants. In the case of removing contaminants from ion exchange regenerant material, this can result in only a fraction of the ion exchange regenerant material undergoing membrane filtration so that it is suitable for reuse, and the remaining ion exchange regenerant material must be disposed of, which may be costly and/or wasteful.

However, a process to remove the contaminants from a solution or suspension in addition to or in place of membrane filtration would allow a larger proportion of the waste material to be reused and considerably reduce the amount of waste material produced.

SUMMARY OF THE INVENTION

According to a first aspect of the present invention, a process is provided for the removal of components from a solution or suspension, which comprises:

(a) pH adjustment of the solution or suspension;
(b) production of a foam containing the components; and
(c) separation of the foam from the liquid, wherein the solution or suspension is an ion exchange regenerant material.

The production of a foam may comprise production of a precipitate, for example, the production of a foam may also involve concomitant production of a precipitate. The separation of the foam from the liquid may result in the separation of the precipitate from the liquid.

The foam may be produced by bubbling gas through the solution or suspension. In addition, the solution or suspension may be heated to aid the foaming process.

Optionally, a salt is added to the solution or suspension prior to and/or during the foaming production step.

In some embodiments, the ion exchange regenerant material is produced from the regeneration of an ion exchange resin used for the removal of contaminants from sugar solutions.

Optionally, the process does not involve the addition of a flocculant.

According to a second aspect of the present invention, an apparatus is provided to carry out the process according to the first aspect of the invention.

DETAILED DESCRIPTION OF THE INVENTION

The present invention relates to a process of separating components from a starting material which may be a solution or suspension. The components may be in solution. The process may seek to remove unwanted components from the starting material and/or to recover the components. The solution or suspension may be aqueous.

The solution or suspension may be the resultant solution following a rinsing or cleaning step. In such circumstances, the solution or suspension can be treated so that a sufficient proportion of the contaminants is removed to allow reuse of the resulting liquid. The resulting solid material may be disposed of or reused as appropriate.

In an embodiment, the solution or suspension comprises ion exchange regenerant material which may contain contaminants from the regeneration of the ion exchange resin. As used herein, the term "ion exchange regenerant material" refers to any material exiting the resin during the regeneration process.

In a preferred embodiment, the ion exchange regenerant material is produced from the regeneration of ion exchange resins used for the decolourisation of sugar solutions.

The ion exchange resin may be acrylic or styrenic. When the ion exchange resin is used for the decolourisation of sugar solutions, the ion exchange resin is preferably anionic. In an embodiment, the ion exchange resin is anionic with quaternary amine functional groups, preferably operated in the chloride form.

The contaminants, including colour bodies, impurities and other fouling agents from decolourisation, may be removed from the resin to regenerate the ion exchange resin so that it can be used again in decolourisation reactions. The material used to regenerate ion exchange resins, hereinafter referred to as regeneration solution, may be an aqueous salt solution. The regeneration solution may contain from between about 5% to about 20% w/w salt. The regeneration solution typically contains 12% w/w salt. In an embodiment, the salt is sodium chloride. The regeneration solution may contain from between about 0.1 to 1.0% w/w base. The regeneration solution typically contains 0.4% w/w base, such as sodium hydroxide.

The ion exchange regenerant material can be treated so that a sufficient proportion of the colour bodies, impurities and other fouling agents is removed to allow reuse as regeneration solution. The reuse of the ion exchange regenerant material reduces the amount of waste material produced by the ion exchange process. This confers significant economic and environmental benefits, as the reduction of water used and waste material produced may reduce the impact on the environment, and the disposal of solution or suspension containing contaminants can be an expensive process.

The colour bodies, impurities and other fouling agents may be suitable for further use. The reuse of these components that are removed from the ion exchange regenerant material may confer additional economic and environmental benefits.

As used herein, the term "components to be removed" refers to some or all of the unwanted components present in a solution or suspension that could be desirable to remove. The components to be removed may comprise contaminants, impurities, fouling agents and/or any part thereof. In this application, the term "contaminants" may be used interchangeably with the term "components to be removed".

When the material is ion exchange regenerant material, the term "contaminants" refers to the components that were removed by the ion exchange resin. When an ion exchange resin is used for the decolourisation of sugar solution, the contaminants in the ion exchange regenerant material may comprise colour bodies, impurities and fouling agents. The contaminants may comprise flavonoids, such as anthocyanidins and/or quinone-related species. The contaminants in the ion exchange regenerant material used for the decolourisation of sugar solution may have a molecular weight of about at least 1000 Daltons. The contaminants may be organic or may be inorganic. The contaminants may be hydrophobic or hydrophilic. The contaminants may be natural or may be synthetic.

The process of the present invention may be used to treat any volume of solution or suspension.

In an embodiment, the components may be removed from the solution or suspension by the production of a foam containing at least some of the components to be removed, followed by the separation of the foam from the liquid output.

Figure 1:
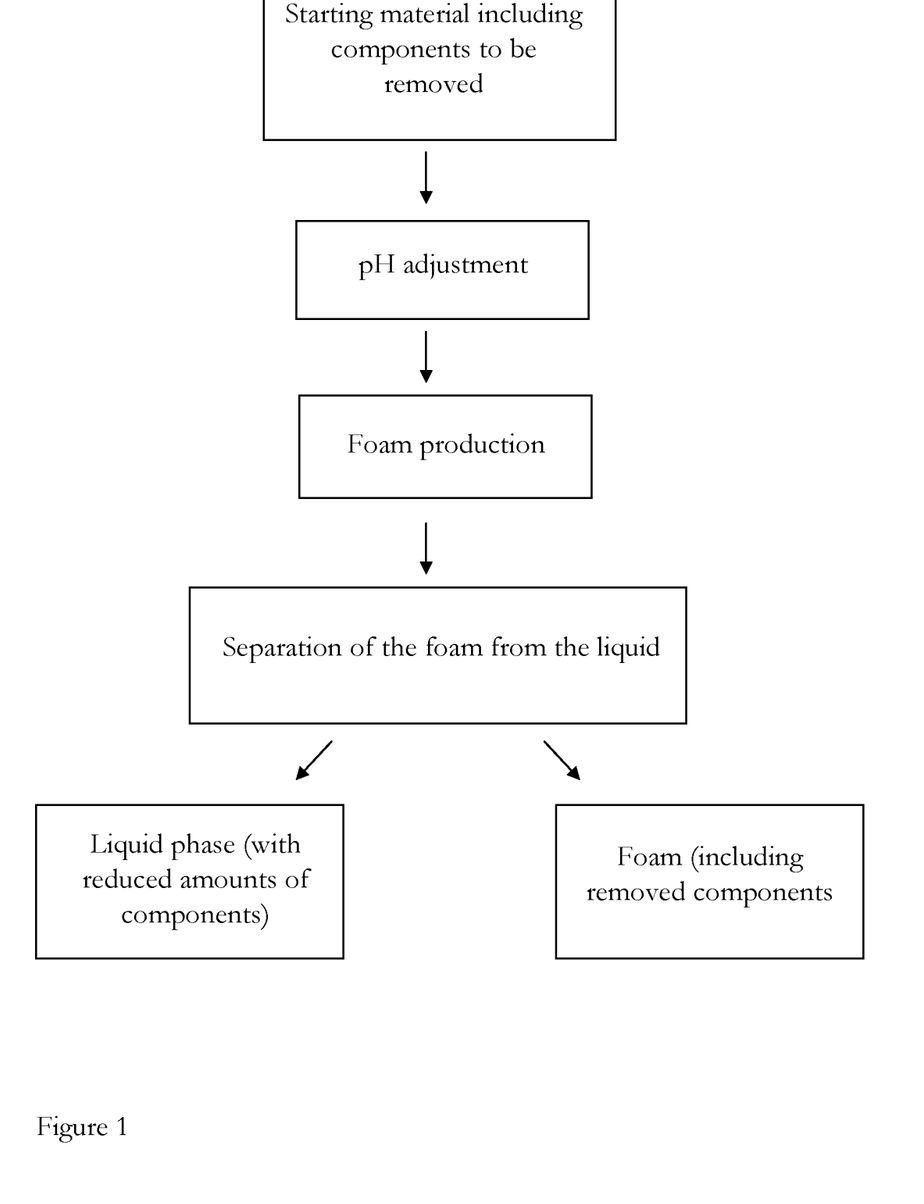
FIG. 1 is a flow diagram illustrating a process for the treatment of a solution or suspension in accordance with one embodiment of the present invention.

FIG. 1 is a flow chart illustrating a process according to an embodiment of the invention, whereby the starting material containing components to be removed undergoes a foam production step.

The pH of the starting material containing components to be removed may be adjusted. The pH-adjusted solution or suspension may be treated so that the components to be removed from the solution or suspension are phase-separated from the liquid by forming a foam (foam production). The foam and the liquid may be separated to produce a liquid phase and a foam, which comprises some or all of the components to be removed (foam separation). The liquid phase may contain a reduced amount of components to be removed when compared with the amount of components to be removed in the starting material. The liquid phase may be free or essentially free from components to be removed, wherein "essentially free" is the presence of components to be removed in amounts insufficient for the solution or suspension to require further processing to remove these components before use or reuse.

The solution or suspension to undergo the pH adjustment, foam production and foam separation step may not undergo any processing to remove contaminants prior to and/or following the foam production step. Alternatively, the foam production step may be preceded and/or followed by further contaminant removal step(s), such as precipitation and/or filtration (e.g. membrane filtration) steps to separate the contaminants, and/or oxidation steps to degrade the contaminants. Consequently, the solution or suspension to undergo the pH adjustment, foam production and foam separation step may be the output from a contaminant removal step, such as a precipitation, membrane filtration step or oxidation step. Alternatively, the solution or suspension to undergo the pH adjustment, foam production and foam separation step may be a combination of solution or suspension that has not undergone any previous processing to remove contaminants and an output from a contaminant removal step. The output from a contaminant removal step may be a liquid output and/or a solid output. The term "solution or suspension" encompasses all of the abovementioned materials. The term "starting material" may be also be used.

The pH adjustment, foam production and foam separation step may comprise acidification. The acidification may comprise lowering the pH of the solution or suspension to between about 1 and about 6.5 (measured at 20° C.). The acidification may comprise lowering the pH of the solution of suspension to less than 5, less than 5.5, less than 6 and/or less than 6.5 (measured at 20° C.). Preferably, the pH of the solution or suspension is about 5 (measured at 20° C.). The pH may be lowered by the addition of an organic or inorganic acid, such as hydrochloric acid or phosphoric acid. Hereinafter, the term "pH adjustment" may refer to the attainment of the appropriate pH of the solution or suspension.

Following pH adjustment, foam may be produced from the solution or suspension. The foam may be produced by bubbling gas through the solution or suspension. The gas may comprise air and/or carbon dioxide. Alternatively and/or in addition, the gas may comprise other suitable gases. A gas flow rate sufficient to achieve foam production may be used.

During and/or prior to the addition of the gas, the solution or suspension may be heated. The temperature of the solution or suspension for foam production may be heated to between about 50° C. and 100° C. at atmospheric pressure. Preferably, the temperature of the solution or suspension is heated to between about 65° C. and 85° C.

Alternatively, the foam production reaction step may be conducted under conditions of high temperature (such as greater than about 100° C.) and high pressure (such as greater than atmospheric pressure), such that the foam may be produced by a subsequent "pressure let down" step such as flash evaporation/cooling which may result in further opportunities for efficiencies in the utilization of energy and water in the overall process. In this case, the foam inducing gas would be water vapour.

Precipitation may be taking place during the acidification and/or foam production step.

It is hypothesised that the pH adjustment step is causing at least some of the contaminants to become protonated and then to undergo a condensation reaction, resulting in an increase in molecular weight and, in some cases, polymerisation.

Bubbling gas through the pH-adjusted solution or suspension and optionally heating may result in the production of foam. The foam may be phase-separated from the remaining liquid in solution or suspension and rise to the top of the container.

The foam may comprise some or all of the components to be removed. It is normal industrial practice to use a flocculant to remove components from solutions or suspensions. The ability to remove components from the pH-adjusted solution or suspension by bubbling gas through the solution or suspension and heating, without the addition of further reagents, such as a flocculant, an anti-microbial agent and/or an oxidising agent, is therefore surprising. Furthermore, it confers a significant advantage, as the production of the foam does not require additional reagents. This may be of considerable value, both in terms of economic and environmental efficiencies.

The foam may be separated from the liquid. The foam may be separated from the liquid by being skimmed off the surface of the liquid. The foam may be collected and/or discarded.

The foam may be collected, for example if the components contained in the foam can be used in a further process. Alternatively and/or in addition, the foam may be discarded. The liquid output may be free or essentially free from the components to be removed, and may therefore be suitable for reuse and/or further processing.

The pH adjustment, foam production and foam separation step may result in the removal of up to 30%, up to 40%, up to 50%, up to 60%, up to 70%, up to 80%, up to 90% or up to 100% of the components to be removed. Additionally or alternatively, there may be removal of at least 10%, at least 20%, at least 30%, at least 40%, at least 50%, at least 60%, at least 70%, at least 80%, at least 90% or at least 95% of the components to be removed.

Optionally, prior to and/or during the foam production stage, salt may be added to the solution or suspension. The addition of salt may aid the foam production process, promoting the separation of the components from the solution and/or the appearance of the components at the surface of the solution. The salt may be an inorganic or an organic salt. A preferred salt is sodium chloride. The salt may be added to form an unsaturated, saturated or supersaturated salt solution. Preferably, the salt is added to form a saturated salt solution.

Ion exchange regeneration solution used for ion exchange resin regeneration typically has a salt concentration of between about 10 and 12% w/w, and therefore the salt concentration of a recovered solution may need to be increased to be suitable for use as an ion exchange regeneration solution. The addition of salt prior to and/or during the foam production step may remove the need for a later addition prior to use as an ion exchange regeneration solution. Fresh salt is needed regardless of whether it is added in the foam production step or at a later stage of producing the ion exchange regeneration solution.

The pH adjustment, foam production and foam separation step may be preceded or followed by a precipitation step. In a preferred embodiment, the pH adjustment, foam production and foam separation step is followed by a precipitation step.

The precipitation step may comprise an acid treatment step to lower the pH of the solution or suspension. The pH of the solution or suspension may need to be lowered to optimise the precipitation step. Preferably, the pH of the solution or suspension is between about 0 and 7 (when measured at 20° C.) prior to precipitation. The pH may be lowered by the addition of an organic or inorganic acid, such as hydrochloric acid or phosphoric acid.

In an embodiment, the precipitation step comprises the addition of a base to the optionally pH-adjusted solution or suspension containing contaminants. The base may be calcium oxide, calcium hydroxide, magnesium hydroxide and/or lime. In a preferred embodiment, the base is lime. The base may be added at a concentration that is sufficient to allow the contaminants to bind to the base. The concentration of the base to be added may be from 0.01 to 2.5% base on weight of feed solution.

The resulting solution may be left for a period of time sufficient to precipitate the contaminants, typically from about 10 minutes to more than 4 hours. To accelerate the precipitation reaction, the solution may be heated. The temperature of the reaction may be between about 10° C. and about 120° C. at atmospheric pressure or greater. Preferably, the temperature of the reaction is between about 70° C. and about 80° C., to optimise energy use. Alternatively, the reaction may be conducted under conditions of high temperature and pressure as described above. The pH of the reaction may be in the range of 8 to 12 (measured at 20° C.). Additional base, preferably sodium hydroxide, may be added to increase the pH of the reaction to 14 (measured at 20° C.) if necessary. Increasing the pH may accelerate the reaction.

In an alternative embodiment, the contaminants are precipitated by the addition of a salt. In this embodiment, a salt may be added to the optionally pH-adjusted solution or suspension containing contaminants. The salt may be an inorganic or an organic salt. A preferred salt is sodium chloride. The salt may be added at a concentration that is sufficient to cause the contaminants to be precipitated out of solution. The salt may be added to form an unsaturated, saturated or supersaturated salt solution. Typically the salt concentration in this reaction step ranges from 0 to 42% w/w, depending on the solubility of the salt.

The resulting solution may be left for a period of time sufficient to precipitate the contaminants, typically from about 10 minutes to more than 4 hours. To accelerate the precipitation reaction, the solution may be heated. The temperature of the reaction may be between about 10° C. and about 120° C. at atmospheric pressure or greater. Preferably, the temperature of the reaction is between about 70° C. and about 80° C., to optimise energy use. Alternatively, the reaction may be conducted under conditions of high temperature and pressure as described above. The pH of the reaction will be in the range of 0 to 7 (measured at 20° C.).

In another alternative embodiment, the contaminants are precipitated by the addition of a base and a salt. In this embodiment, a base may be added to the optionally pH-adjusted solution or suspension containing contaminants. The base may be calcium oxide, calcium hydroxide, magnesium hydroxide and/or lime. In a preferred embodiment, the base is lime. The base may be added at a concentration that is sufficient to allow the contaminants to bind to the base. The concentration of the base to be added may be from 0.01 to 2.5% base on weight of feed solution. Additional base, preferably sodium hydroxide, may be added to increase the pH of the reaction to 14.0 if necessary (measured at 20° C.). Increasing the pH will accelerate the reaction.

A salt may be added to the base-treated solution. The salt may be an inorganic or an organic salt. A preferred salt is sodium chloride. The salt may be added at a concentration that is sufficient to cause the contaminants to be precipitated out of solution. The salt may be added to form an unsaturated, saturated or supersaturated salt solution. Typically the salt concentration in this reaction step ranges from 0 to 42% w/w, depending on the solubility of the salt.

The resulting solution may be left for a period of time sufficient to precipitate the contaminants, typically from about 10 minutes to more than 4 hours. To accelerate the precipitation reaction, the solution may be heated. The temperature of the reaction may be between about 10° C. and about 120° C. at atmospheric pressure or greater. Preferably, the temperature of the reaction is between about 70° C. and about 80° C., to optimise energy use. Alternatively, the reaction may be conducted under conditions of high temperature and pressure as described above. The pH of the reaction may be in the range of 8 to 12 (measured at 20° C.). Additional base, preferably sodium hydroxide, may be added to increase the pH of the reaction to 14 (measured at 20° C.) if necessary. Increasing the pH may accelerate the reaction.

The preferred embodiment of the precipitation step to be used may be dependent on the nature of the solution or suspension to be treated, and/or the pH, salt concentration and/or temperature of the material prior to the treatment step. For example, if the precipitation directly follows the pH adjustment step, the precipitation step comprising salt addition and pH adjustment may be preferred.

Following precipitation of the contaminants, the precipitate may be separated from the liquid by any method known in the art. Possible methods include filtration, sedimentation and centrifugation.

In an embodiment, filtration may be carried out using a salt bed, such as a sodium chloride salt bed, or a sand bed. If the solution to be filtered is unsaturated, the salt bed may dissolve over time and the salt may be replaced by the contaminants in the solution to be filtered. As a consequence, the resulting liquid output may contain salt with fewer contaminants than a sand bed due to the further precipitation of these contaminants resulting from their displacement from the solution by the salt dissolving. This would be particularly advantageous when the liquid output is used as ion exchange regeneration solution for the regeneration of ion exchange resins used for sugar decolourisation, as in this case it is desirable for the ion exchange regeneration solution to contain salt. The solution exiting any salt bed filter may be saturated with salt, for example having a concentration of 0 to 42% w/w salt, depending on the salt used. A salt concentration of about 10 to 12% is particularly desirable for ion exchange regenerant solution.

In an embodiment, the saturated solution exiting the salt bed filter may be diluted by acting as the draw stream of a forward osmosis operation acting on a low dissolved solids stream (either low in salt or contaminants).

Following the replacement of the salt in the salt bed with contaminants, the contaminants may need to be removed and replaced with fresh salt.

In an embodiment, salt carrying high levels of contaminants that need to be removed from the salt bed filter could be removed by washing out with water. This salt/contaminant/water mix may then be used as a feed stream to a suitable solvent extraction system, for example, a pulsed column design, or other suitable system. By using a suitable solvent the contaminants may be removed from the feed solution, producing a clean salt/water solution and a contaminant-laden solvent stream. This solvent may be recovered by evaporation, producing a re-usable solvent and a solid contaminant stream free of salt.

Prior to or following removal of the precipitate from the solution, the pH of the solution may be adjusted.

If the precipitate is formed by the addition of a base to the solution or suspension, the pH of the base-treated solution may be lowered from a range of 8 to 14 to a range of 7 to 8 (measured at 20° C.) when the contaminants have been precipitated. The pH may be lowered by the addition of a neutralising agent. A suitable neutralising agent may be carbon dioxide, sulphur dioxide and/or a dilute acid, such as phosphoric acid.

In an embodiment, the precipitate formed by the addition of a base to the solution or suspension is removed prior to lowering the pH.

Following the adjustment of the pH, any resulting precipitate may be removed from the liquid by any method known in the art.

If the precipitate is formed by the addition of a salt to the solution or suspension, the pH of the salt-treated solution may be raised from the range 1 to 7 to a range of 7 to 14, or 7 to 10 (measured at 20° C.) when the contaminants have been precipitated. A suitable neutralising agent may be sodium hydroxide.

In an embodiment, the precipitate formed by the addition of a salt to the solution or suspension is removed prior to raising the pH.

If the precipitate is formed by the addition of a base and a salt to the solution or suspension, the pH of the base- and salt-treated solution may be lowered from the range 8 to 14 to the range 7 to 8 (measured at 20° C.) when the contaminants have been precipitated. A suitable neutralising agent may be carbon dioxide, sulphur dioxide and/or a dilute acid, such as phosphoric acid. Following the adjustment of the pH, any resulting precipitate may be removed from the liquid by any method known in the art.

In an embodiment, the precipitate formed by the addition of a base and a salt to the solution or suspension is removed prior to lowering the pH.

The precipitation step may produce a liquid output and a solid output. The solid output from the precipitation step may be discarded. Alternatively, the solid output may be used in another process. The liquid output from the precipitation step may undergo a pH adjustment, foam production and foam separation step and/or a membrane filtration step and/or an oxidation step, or may be suitable for use without any further processing.

The pH adjustment, foam production and foam separation step may be preceded or followed by a membrane filtration step.

The membrane filtration step may comprise a membrane filtration step and/or a membrane diafiltration step, and any combination thereof. Preferably, a membrane filtration step is followed by a membrane diafiltration step.

In an embodiment, the membrane filtration step comprises nanofiltration.

For the membrane filtration step, the temperature of the solution or suspension may be altered so that it is at an optimal temperature for membrane filtration. The optimal temperature for membrane filtration may be between about 45° C. to about 60° C. The temperature of the solution or suspension may be corrected by passing it through one or more heat exchanger(s).

The solution or suspension may be passed through one or more membrane filtration membrane(s) to remove the contaminants.

The preferred membrane filtration membrane may have a molecular weight cut-off of 200-2000 Daltons. When it is desirable to remove contaminants that are larger or smaller than this size range, membranes with larger or smaller pore sizes may be used.

The membrane(s) may be ceramic. The membrane(s) may comprise polyamide and/or polyethersulphone. Preferably, the membrane(s) is(are) polyethersulphone. The membrane(s) may be spiral wound, preferably with a diameter of about 5 cm to about 30 cm. When more than one membrane is used, the membranes may be set in series or parallel flow patterns.

The solution or suspension may be passed through the one or more membrane filtration membrane(s) at a volume concentration factor (VCF) of between about 2 and 25. The operating trans-membrane pressure (TMP) may be between about 2 and bar (0.2 to 3 MPa), and the operating pressure may be between about 2 and 40 bar (0.2 to 4 MPa).

The membrane filtration step produces a permeate and a retentate. The retentate may contain large amounts of contaminants. This may be processed by membrane diafiltration. Alternatively and/or in addition, the retentate from the membrane filtration step may be processed by a pH adjustment, foam production and foam separation step, a precipitation step and/or an oxidation step. The permeate from the membrane filtration step may undergo a pH adjustment, foam production and foam separation step, a precipitation step, a membrane diafiltration step and/or an oxidation step, or may be suitable for use without any further processing.

A solution or suspension may be passed through one or more membrane(s) (hereinafter referred to as the diafiltration membrane) to remove the contaminants.

In one embodiment, the retentate from a membrane filtration step undergoes diafiltration. In an alternative embodiment, the liquid output of the pH adjustment, foam production and foam separation step undergoes diafiltration.

For the membrane diafiltration step, the retentate from the membrane filtration step may be diluted prior to being passed through the filtration membranes. In an embodiment, the retentate from the membrane filtration step may be diluted with a solution or suspension that contains a lower level of contaminants than the retentate from the membrane filtration step, for example, the liquid output from the pH adjustment, foam production and foam separation step. Preferably, the temperature of the solution or suspension to undergo diafiltration is adjusted to about 45° C. to 60° C.

The diafiltration membrane(s) may be a membrane filtration membrane, with a molecular weight cut-off of 200-2000 Daltons. When it is desirable to remove contaminants that are larger or smaller than this size range, membranes with larger or smaller pore sizes may be used.

The diafiltration membrane(s) may be ceramic. The membrane(s) may comprise polyamide and/or polyethersulphone. Preferably, the membrane(s) is(are) polyethersulphone. The diafiltration membrane(s) may be spiral wound, preferably with a diameter of about 5 cm to about 30 cm. When more than one diafiltration membrane is used, the membranes may be set in series or parallel flow patterns.

The solution or suspension may be passed through the one or more diafiltration membrane(s) at a volume concentration factor (VCF) of between about 2 and 30. The operating trans-membrane pressure (TMP) may be between about 2 and 40 bar (0.2 to 3 MPa), and the operating pressure may be between about 2 and 40 bar (0.2 to 4 MPa).

The retentate from the membrane diafiltration step may contain the contaminants present in the starting material of the diafiltration step. In a preferred embodiment, the retentate from the membrane diafiltration step undergoes a precipitation step, as outlined above. The retentate from the membrane diafiltration step may undergo a pH adjustment, foam production and foam separation step.

Alternatively and/or in addition, the retentate from the membrane diafiltration step may be a waste product and may be disposed of or may be further treated (for example at a waste water treatment plant). The permeate (i.e. a liquid output) from the membrane diafiltration step may undergo a pH adjustment, foam production and foam separation step, a precipitation step and/or an oxidation step, or may be suitable for use without any further processing.

The pH adjustment, foam production and foam separation step may be preceded or followed by an oxidation step. In a preferred embodiment, the pH adjustment, foam production and foam separation step is followed by an oxidation step.

The oxidation step may break down the contaminants into smaller units by breaking the double bonds.

The oxidation step may comprise oxidising the contaminants in the solution or suspension by adding ozone and/or peroxide, and by optionally adding hypochlorite. Alternatively, the oxidation step may comprise breaking down the contaminants by adding hypochlorite alone. As used herein, the term "oxidation step" comprises oxidising the contaminants in the solution or suspension by adding ozone and/or peroxide and optionally hypochlorite, and breaking down the contaminants in the solution or suspension by adding hypochlorite alone.

When the oxidation step comprises adding ozone and/or peroxide and optionally adding hypochlorite, the pH of the solution to be oxidised may be adjusted to between about 8 and 14 (measured at 20° C.). The pH may be adjusted by the addition of a base, such as sodium hydroxide.

The contaminants in the solution or suspension may be oxidised by the addition of ozone. Ozone may be added by using a commercially available ozone generator.

Alternatively and/or in addition, ozone may be added by the addition of peroxide. Preferably, ozone is added by using a commercially available ozone generator and optionally operating at higher than atmospheric pressure. A suitable peroxide is hydrogen peroxide. The ozone may be added at a concentration that is sufficient to oxidise the contaminants in the solution. The reaction temperature may be adjusted to increase the efficiency of oxidation of the contaminants. The reaction temperature may be between about 10° C. and about 120° C. and the reaction may be conducted at or above about 1 atm. The use of higher temperatures and pressures greater than 1 atm may promote a more complete reaction. The pH of the solution may be about 10 or higher, which may decrease to about 8 when the reaction is complete.

The oxidation of the contaminants may be enhanced by the addition of hypochlorite. Hypochlorite may be added by the addition of a hypochlorite solution. A preferred hypochlorite solution is sodium hypochlorite. Alternatively and/or in addition, hypochlorite may be generated by the application of an electric current in an electrolytic cell. Preferably, hypochlorite is generated by the application of an electric current in an electrolytic cell. The electric current is preferably a low voltage DC current.

When the oxidation step comprises adding hypochlorite alone, the pH of the solution to be oxidised may be adjusted to between about 8 and 14 (measured at 20° C.). The pH may be adjusted by the addition of a base, such as sodium hydroxide.

The contaminants in the solution to be oxidised may be oxidised by the addition of hypochlorite. Hypochlorite may be added by the addition of a hypochlorite solution. A preferred hypochlorite solution is sodium hypochlorite. Alternatively and/or in addition, hypochlorite may be generated by the application of an electric current in an electrolytic cell. Preferably, hypochlorite is generated by the application of an electric current in an electrolytic cell. The electric current is preferably a low voltage DC current. The temperature of the oxidation reaction may be adjusted to increase the efficiency of the oxidation of the contaminants. The reaction temperature may be between about 10° C. and about 120° C. and the reaction may be conducted at or above about 1 atm. The use of higher temperatures and pressures greater than 1 atm may promote a more complete reaction.

The oxidation step may produce a liquid output. The liquid output may undergo a pH adjustment, foam production and foam separation step, a precipitation step and/or a membrane filtration step, or may be suitable for use without any further processing.

In order that the invention may be more fully understood, embodiments thereof will now be described, by way of example only, with reference to the accompanying drawings.

For all embodiments, the process may be carried out by batch or continuous production.

Figure 2:
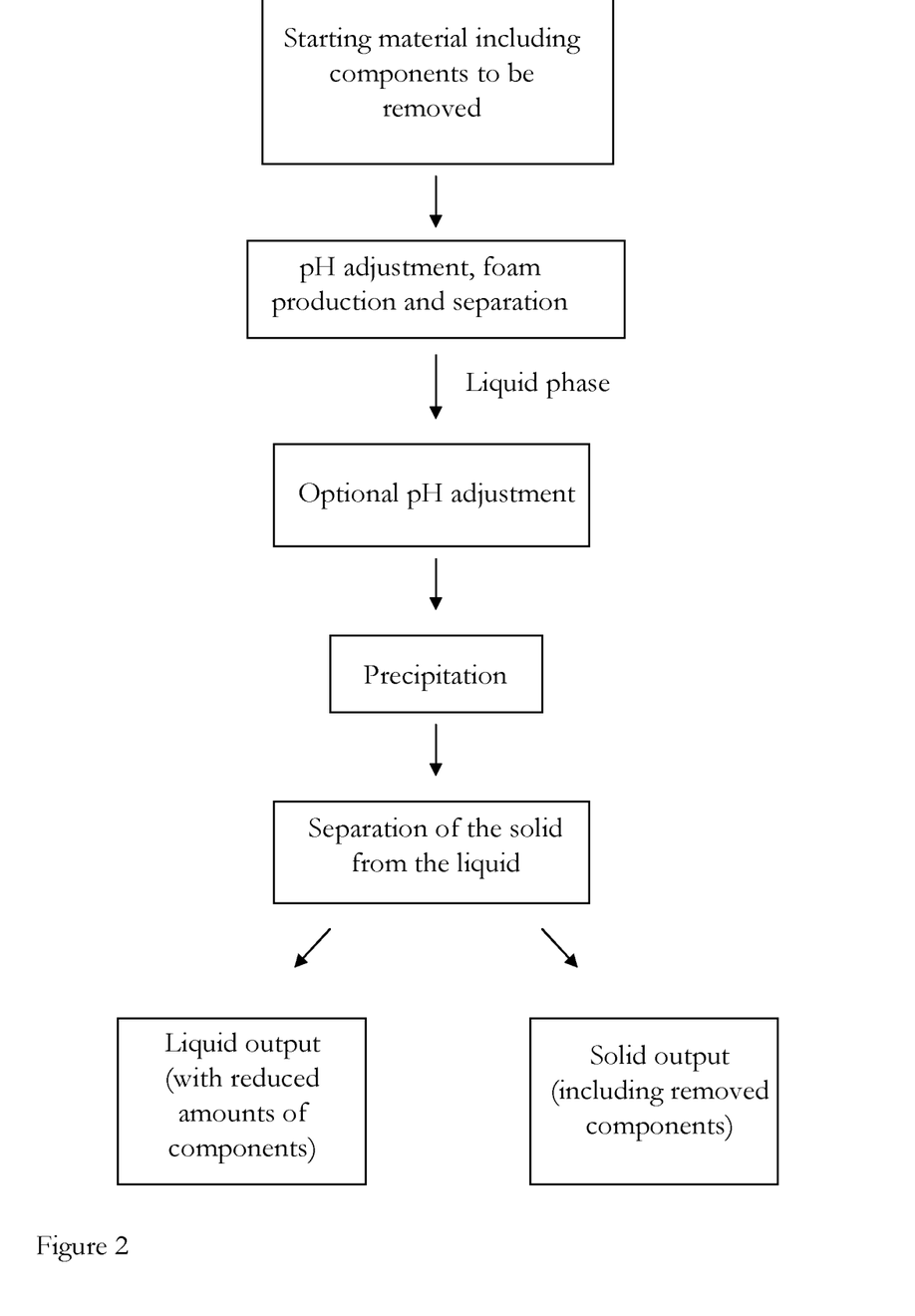
FIG. 2 is a flow diagram illustrating a process for the treatment of a solution or suspension in accordance with an alternative embodiment of the present invention.

FIG. 2 is a flow chart illustrating a process according to an embodiment of the invention, whereby the solution or suspension containing contaminants undergoes a pH adjustment, foam production and foam separation step and the liquid phase from the pH adjustment, foam production and foam separation step undergoes optional pH adjustment and undergoes a precipitation step. The liquid output is separated from the solid output of the precipitation step. The liquid output from the precipitation step contains a reduced amount of contaminants when compared with the amount of contaminants in the starting material, and may be free or essentially free from contaminants.

Figure 3:
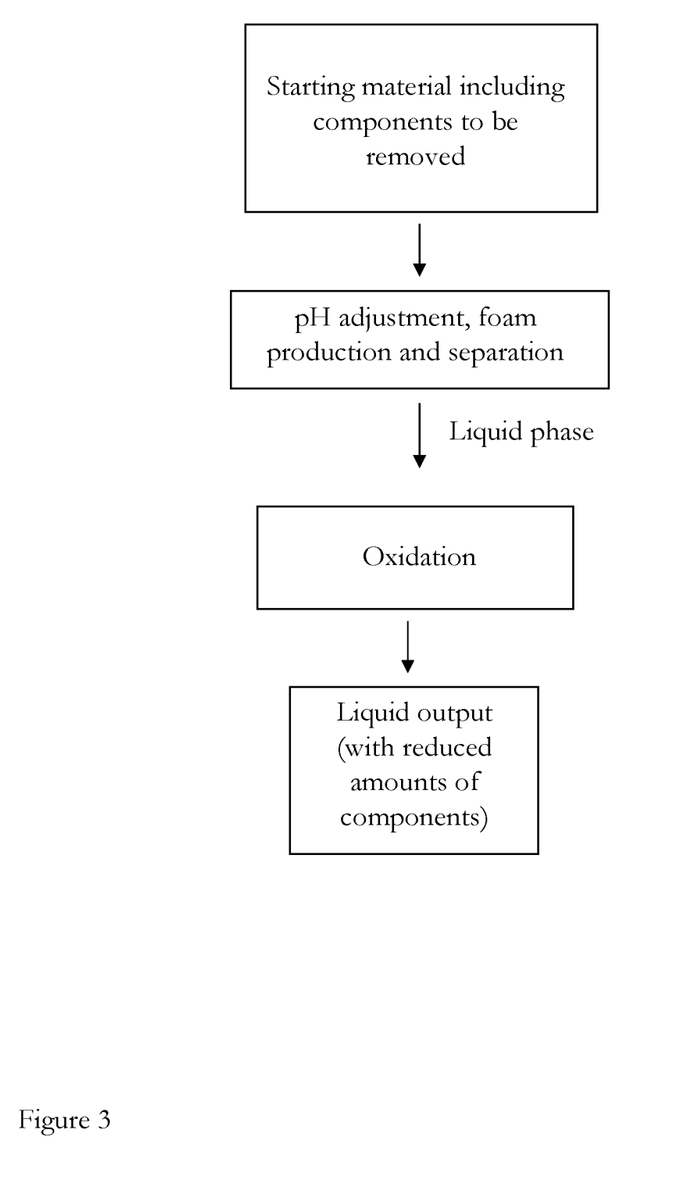
FIG. 3 is a flow diagram illustrating a process for the treatment of a solution or suspension in accordance with an alternative embodiment of the present invention.

FIG. 3 is a flow chart illustrating a process according to an embodiment of the invention, whereby the solution or suspension containing contaminants undergoes a pH adjustment, foam production and foam separation step and the liquid phase from the pH adjustment, foam production and foam separation step undergoes an oxidation step. The liquid output from the oxidation step contains a reduced amount of contaminants when compared with the amount of contaminants in the starting material, and may be free or essentially free from contaminants.

Figure 4:
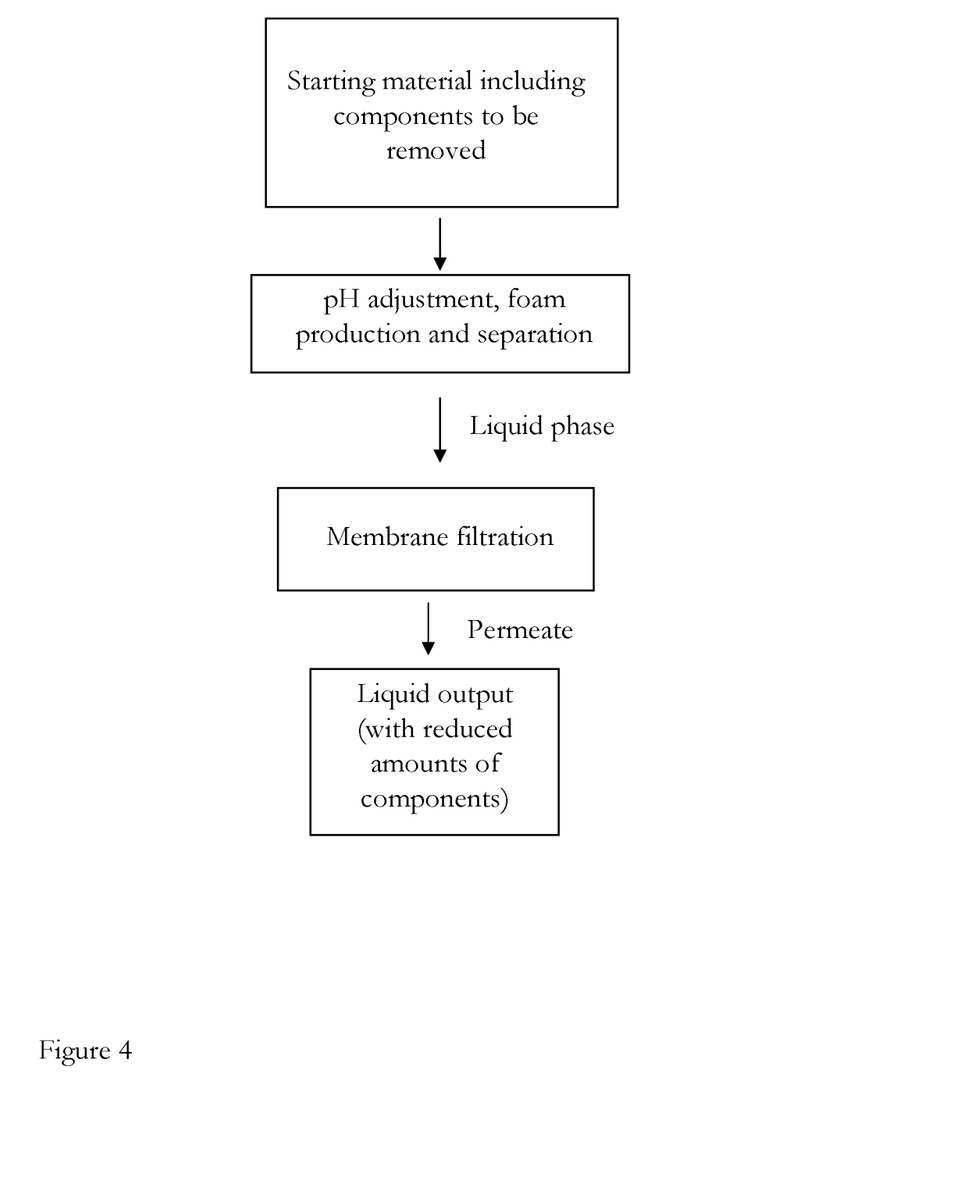
FIG. 4 is a flow diagram illustrating a process for the treatment of a solution or suspension in accordance with an alternative embodiment of the present invention.

FIG. 4 is a flow chart illustrating a process according to an embodiment of the invention, whereby the solution or suspension containing contaminants undergoes a pH adjustment, foam production and foam separation step and the liquid phase from the pH adjustment, foam production and foam separation step undergoes a membrane filtration step. The permeate from the membrane filtration step contains a reduced amount of contaminants when compared with the amount of contaminants in the starting material, and may be free or essentially free from contaminants.

Figure 5:
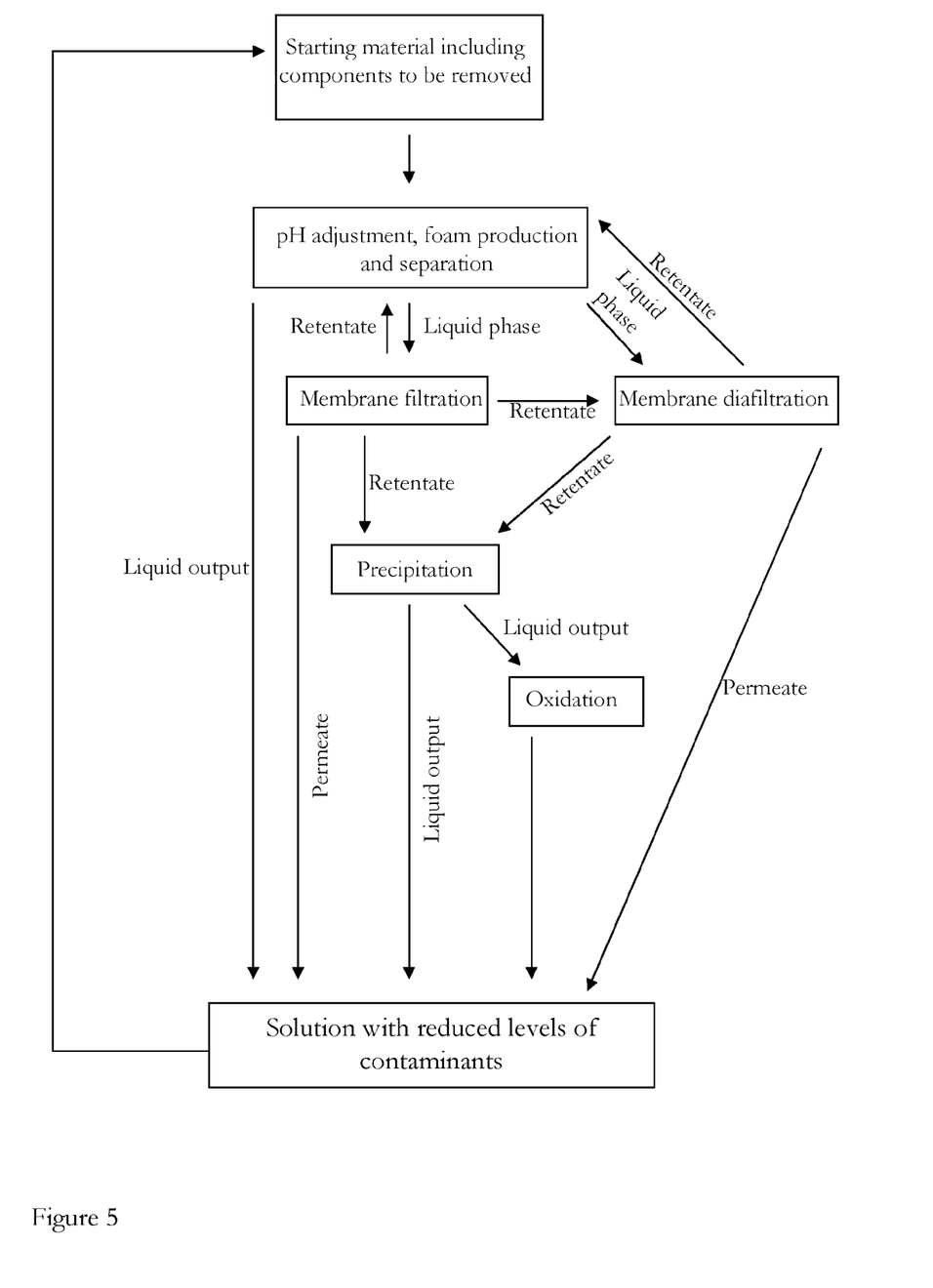
FIG. 5 is a flow diagram illustrating a process for the treatment of a solution or suspension in accordance with an alternative embodiment of the present invention.

FIG. 5 is a flow chart illustrating a process according to an embodiment of the invention, whereby the solution or suspension containing contaminants undergoes a pH adjustment, foam production and foam separation step and the liquid phase from the pH adjustment, foam production and foam separation step may optionally undergo a membrane filtration step and/or a membrane diafiltration step. The retentate from the membrane filtration step may optionally undergo a membrane diafiltration step and/or a pH adjustment, foam production and foam separation step and/or a precipitation step. The retentate from the membrane diafiltration step may optionally undergo a pH adjustment, foam production and foam separation step and/or a precipitation step. The liquid output from the precipitation step may optionally undergo an oxidation step. The liquid phase from the pH adjustment, foam production and foam separation step, the permeate from the membrane filtration step, the permeate from the membrane diafiltration step, the liquid output from the precipitation step and the liquid output from the oxidation step contain a reduced amount of contaminants when compared with the amount of contaminants in the starting material, and may be free or essentially free from contaminants.

According to an embodiment, the solution or suspension to undergo treatment to remove contaminants is ion exchange regenerant material. In a preferred embodiment, the solution or suspension to undergo treatment to remove contaminants is ion exchange regenerant material from the regeneration of ion exchange resins used for the decolourisation of sugar solutions.

Figure 6:
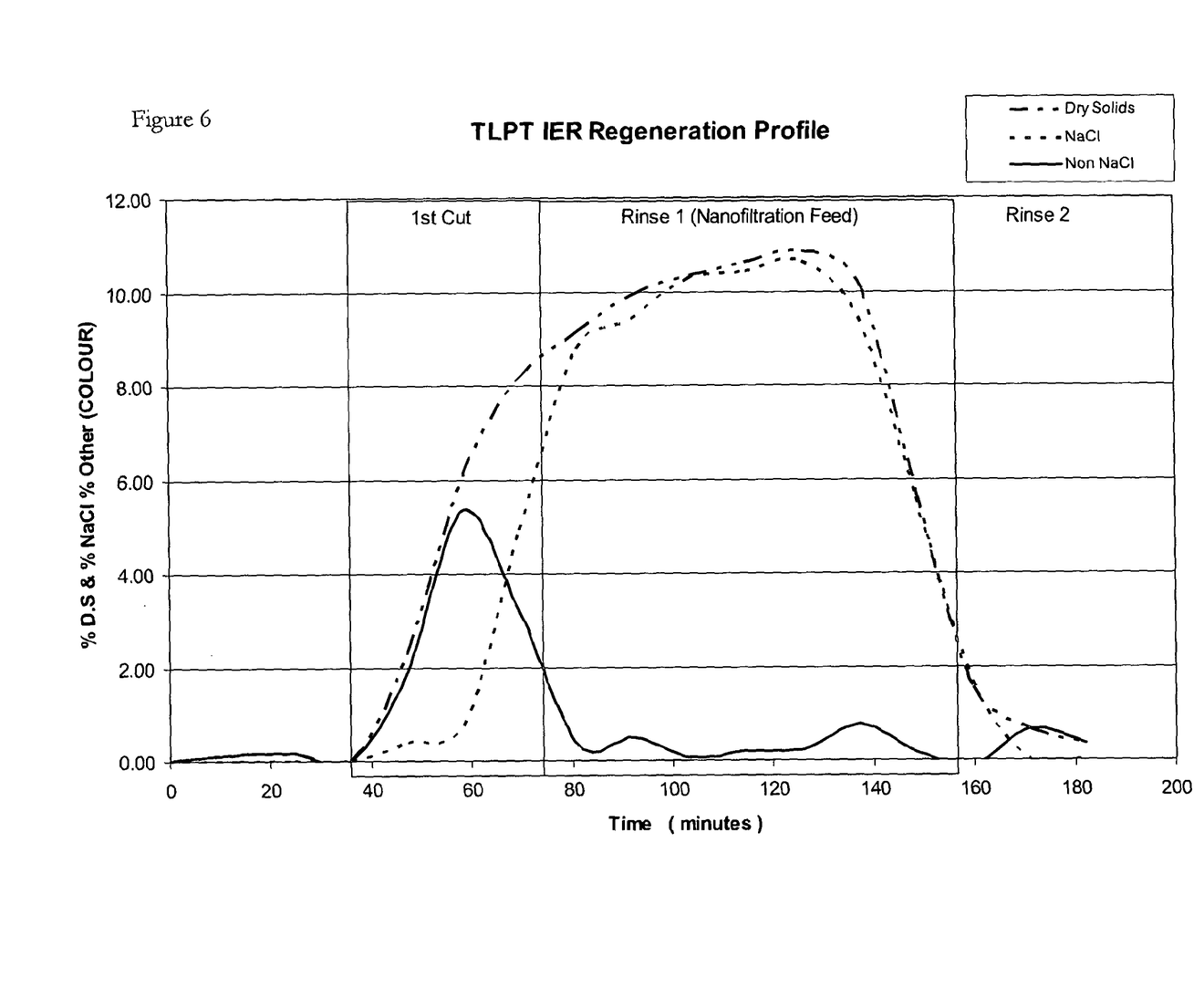
FIG. 6 illustrates a typical regeneration profile from the regeneration of an ion exchange resin used for the decolourisation of sugar solutions.

A diagram of a typical ion exchange regenerant material from the regeneration of ion exchange resins used for the decolourisation of sugar solutions is shown in FIG. 6.

An ion exchange resin that is ready for regeneration contains resin loaded with contaminants, but otherwise contains pure water. Aqueous salt solution may be used as the regeneration solution, and the preferred salt is sodium chloride. Liquid flow through the resin media is typically plug flow, with no mixing occurring over the resin bed. As a consequence, during regeneration of the resin with aqueous salt solution, the first material exiting the resin, upon commencing the flow of the salt solution, is water containing little or no salt or contaminants. Following this, there is an almost immediate breakthrough of contaminants in the effluent, with a low salt concentration. This material can be denoted as the First Cut. This First Cut material may be disposed of, but may also be treated by the pH adjustment, foam production and foam separation step, the precipitation steps and/or the oxidation steps of the present invention.

Following the First Cut, there is a large volume of material leaving the ion exchange resin that can be treated by the pH adjustment, foam production and foam separation step, precipitation, oxidation and/or membrane filtration. This material is suitable for membrane filtration in particular. This material has higher salt concentrations and lower concentrations of contaminants than the First Cut, and is known as Rinse 1.

Following the production of Rinse 1 material, the salt solution required for regeneration has been exhausted, so clean water (such as process water) is used. There is then a dramatic decrease in the concentration of the salt and the contaminants as the clean water starts to exit the resin bed. This material, generally denoted here as Rinse 2, is still being pushed through the resin bed by clean water. Rinse 2 material may be disposed of, but may also be treated by the pH adjustment, foam production and foam separation step, membrane filtration, the precipitation step and/or the oxidation step of the present invention. Rinse 2 material is particularly suitable for treatment by the membrane diafiltration step. At the end of a successful regeneration the ion exchange resin can be said to contain resin fully capable of removing contaminants from a feed stream, as well as clean water.

As highlighted previously, the output(s) from the pH adjustment, foam production and foam separation step and/or the precipitation step and/or the membrane filtration steps and/or the oxidation steps may be further processed and reused in the regenerant treatment, which may further minimise the amount of liquid and/or solid output that is disposed of, thereby further reducing the potential environmental and economic impact of the initial solution or suspension containing contaminants. Furthermore, the abovementioned steps enable the collection of components to be removed from the starting material as a solid output, which may be used for further processes.

Figure 7:
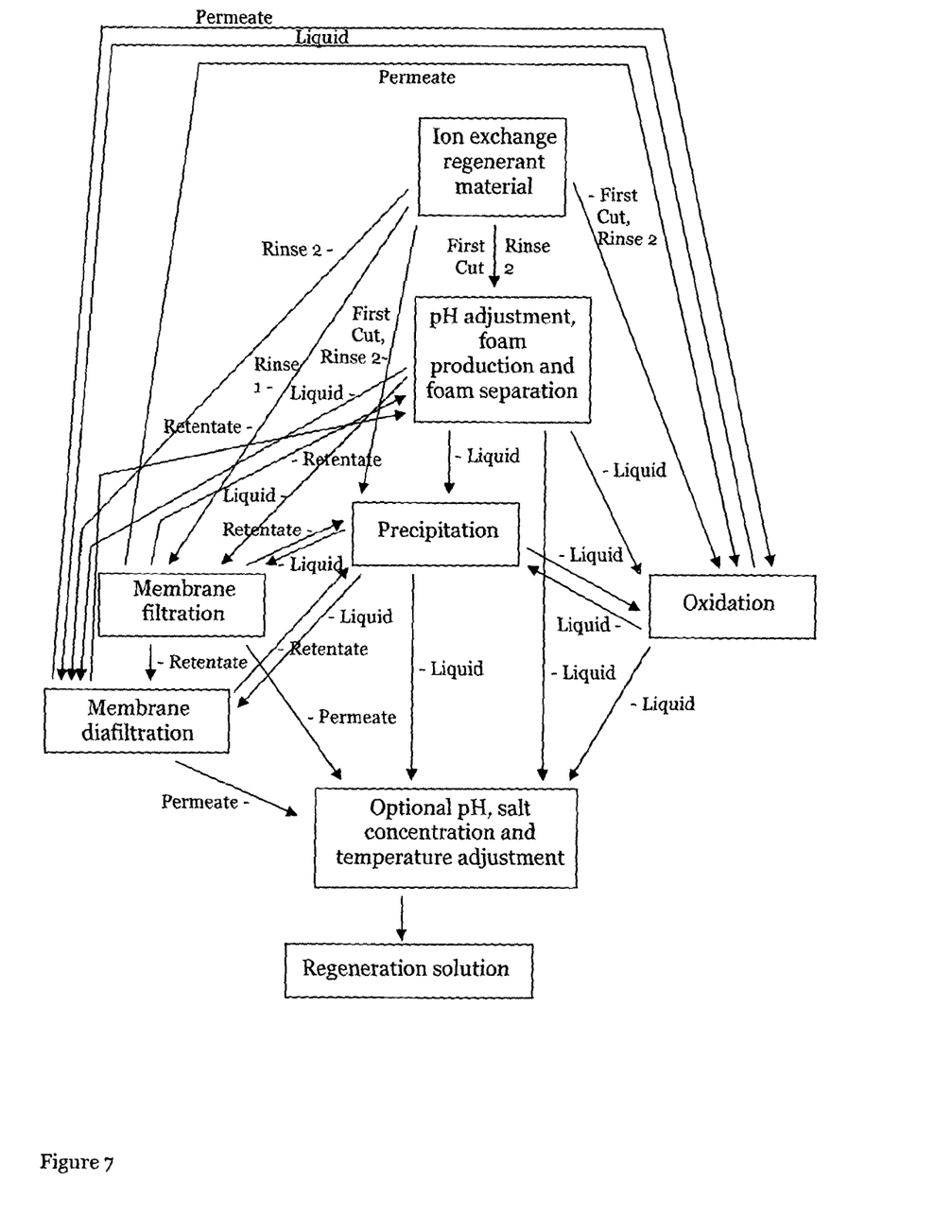
FIG. 7 is a flow diagram illustrating a process for the treatment of a solution or suspension in accordance with an alternative embodiment of the present invention.

FIG. 7 is a flow diagram illustrating a process of treating ion exchange regenerant solution according to an embodiment, which indicates how the output(s) from the individual steps may be further processed, to maximise the reduction in contaminants in aqueous solution and, optionally, to maximise the amount of ion exchange regeneration solution produced and minimise the amount of material that is disposed of.

Rinse 1 ion exchange regenerant material is processed by a membrane filtration step. The retentate from the membrane filtration step is processed by membrane diafiltration, a precipitation step and/or by a pH adjustment, foam production and foam separation step. The permeate from the membrane filtration step may be suitable for reuse as ion exchange regeneration solution. In an embodiment, the ion exchange regeneration solution is a solution containing 12% sodium chloride and 0.4% base. Rinse 1 ion exchange regenerant material therefore has a high salt concentration and the permeate from the membrane filtration and the diafiltration steps would also have high salt concentrations, and may require the addition of a small amount of salt or may not require the addition of any salt prior to reuse as a regeneration solution. Alternatively, the permeate from the membrane filtration step may undergo an oxidation step.

Rinse 2 ion exchange regenerant material may be processed by a membrane diafiltration step. More specifically, Rinse 2 ion exchange regenerant material may be used for dilution in a membrane diafiltration step. Preferably, the Rinse 2 ion exchange regenerant material dilutes the retentate from the membrane filtration step. However, an alternative diluent, such as clean water, may also be used. The retentate from the membrane diafiltration step may undergo a pH adjustment, foam production and foam separation step and/or a precipitation step. The permeate from the membrane diafiltration step may be suitable for reuse as ion exchange regeneration solution. Alternatively, the permeate from the membrane diafiltration step may undergo an oxidation step and/or a pH adjustment, foam production and foam separation step.

Rinse 2 and First Cut ion exchange regenerant material may be processed by a pH adjustment, foam production and foam separation step. The liquid phase from the pH adjustment, foam production and foam separation step may be suitable for reuse as ion exchange regeneration solution. Alternatively, the liquid phase from the pH adjustment, foam production and foam separation step may undergo a membrane filtration, membrane diafiltration and/or precipitation step. Alternatively, the liquid phase from the pH adjustment, foam production and foam separation step may undergo an oxidation step.

Rinse 2 and First Cut ion exchange regenerant material may be processed by a precipitation step. The liquid output from the precipitation step may be suitable for reuse as ion exchange regeneration solution. Alternatively, the liquid output from the precipitation step may undergo a membrane filtration or membrane diafiltration step. Alternatively, the liquid output from the precipitation step may undergo an oxidation step.

Rinse 2 and First Cut ion exchange regenerant material may be processed by an oxidation step. The liquid output from the oxidation step may be suitable for reuse as ion exchange regeneration solution. Alternatively, the liquid output from the oxidation step may undergo a membrane diafiltration or precipitation step.

Prior to its reuse as regeneration solution, the liquid output from the membrane filtration, membrane diafiltration, precipitation and/or oxidation steps may require further treatment. For example, for reuse as an ion exchange regeneration solution for ion exchange resins used for the decolourisation of sugar solutions, the pH of the regeneration solution may be between about 7 and 14, the salt concentration may be between about 2 and 20% w/w, the base concentration may be between about 0.1% and 1.0% w/w, and the temperature of the solution may be between about 75° C. to about 90° C. Preferably, the salt concentration of the ion exchange regeneration solution is about 12% w/w and the base concentration is about 0.5% w/w. The pH, salt concentration and/or temperature of the liquid outputs from the pH adjustment, foam production and foam separation, membrane filtration, membrane diafiltration, precipitation and/or oxidation steps may therefore need to be adjusted prior to use as a regeneration solution. The salt concentration may be altered by the addition of fresh saturated brine solution. The liquid outputs from the pH adjustment, foam production and foam separation, membrane filtration, membrane diafiltration, precipitation and/or oxidation steps may be treated separately. Alternatively, the liquid outputs may be combined and treated together.

Experimental

Figure 8:
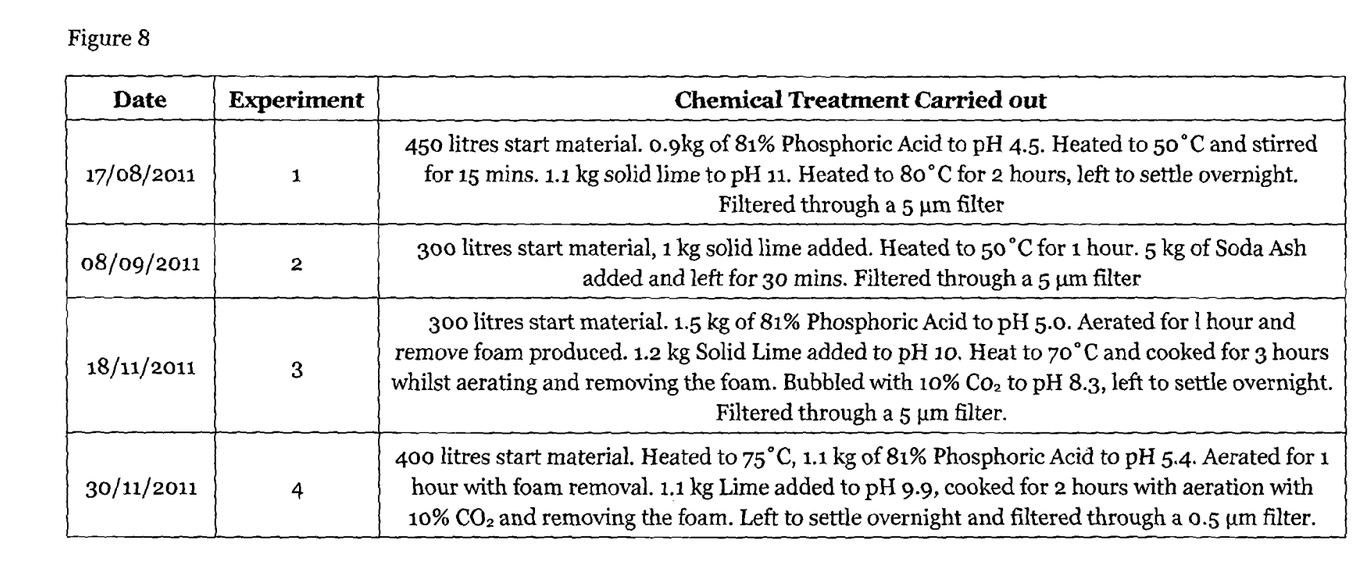
FIG. 8 is a table indicating the conditions for experiments 1 to 4.

Starting material (ion exchange regenerant material from the regeneration of ion exchange resin used for the removal of components from sugar solutions) was analysed by the following treatments: precipitation (experiment 1), followed by membrane filtration; simple precipitation step as disclosed in US 2011/0077144 (experiment 2), followed by membrane filtration; and foam production and precipitation experiments 3 and 4), followed by membrane filtration. FIG. 8 provides further information on the protocols followed. In all experiments, a control was performed, in which no chemical treatment (i.e. the treatment for each experiment indicated in FIG. 8) was carried alt.

Figure 9:
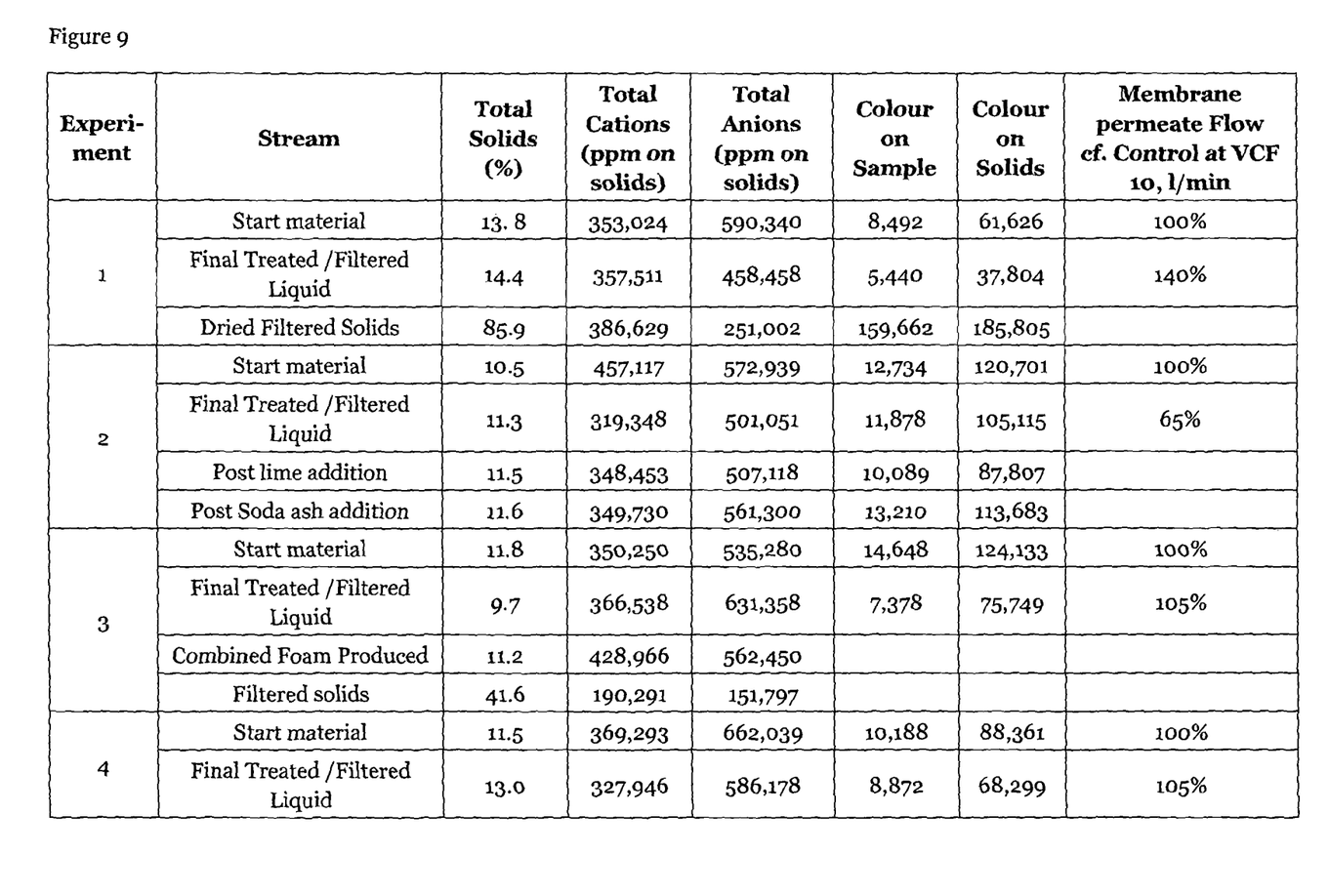
FIG. 9 is a table indicating the results of experiments 1 to 4.

The results are shown in FIG. 9. For all experiments, chemical treatment was carried out on the starting material, and membrane filtration was carried out on the treated liquid (at a volume concentration factor, VCF, of 5, 10 or 12).

The total solids, colour, total cations and total anions were measured at the stages indicated in FIG. 9, up to the membrane filtration step.

The total solids were calculated using a moisture balance. The total cations were calculated by measuring the cations in the sample using inductively coupled plasma atomic emission spectroscopy (ICP-AES). The total anions were calculated by measuring the anions in the sample using Dionex ion chromatography. The amount of colour in the samples and the solids was measured using UV-Visible spectroscopy.

From the results, it can be seen that treatment according to experiments 3 and 4 results in the removal of a large proportion of the colour bodies from the starting material.

Following treatment of the starting material in accordance with experiments 1 to 4, the resulting treated liquid then underwent membrane filtration.

The right-hand column of FIG. 9 illustrates the membrane permeate flow rate as compared with an untreated control sample, for membrane filtration at a VCF of 10. The membrane permeate flow rate was calculated by measuring the time taken to collect a known volume of permeate at constant pressure and temperature.

It can be seen from FIG. 9 that the resulting permeate from experiments 3 and 4 has a high flow rate compared to the control. Flow rate is affected by the presence of components in the liquid that block the pores of the membrane. The higher the flow rate, the fewer fouling agents are present in the liquid. Therefore, the high flow rates of the liquids treated according to experiments 3 and 4 show that there are fewer fouling agents in the liquid compared with the control. In contrast, the membrane permeate flow rate of the liquid treated according to experiment 2 is much lower than the control.

Moreover, the treated liquid could be run at a VCF higher than the untreated solution (the control), which was typically 10 (data not shown). This is dependent on the quality of the starting material, which is itself a function of the quality of the raw sugar.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A process for the removal of components from a solution or suspension, which comprises:
   (a) adjusting the pH of the solution or the suspension;
   (b) producing a foam containing the components; and
   (c) separating the foam from the solution or the suspension, thereby yielding a recovered liquid,
   wherein the solution or suspension is an ion exchange regenerant material produced from regeneration of an ion exchange resin using a first aqueous salt solution, and the recovered liquid is a second aqueous salt solution.

2. The process of claim 1, further comprising producing a precipitate from the solution or the suspension and separating the precipitate from the recovered liquid.

3. The process of claim 1, wherein the producing the foam comprises bubbling gas through the solution or suspension.

4. The process of claim 1, further comprising heating the solution or suspension.

5. The process of claim 1, wherein a salt is added to the solution or suspension prior to or during the producing the foam.

6. The process of claim 1, wherein the ion exchange regenerant material is produced from the regeneration of an ion exchange resin used for the removal of contaminants from sugar solutions.

7. The process of claim 1, wherein the process does not involve the addition of a flocculant.

8. The process of claim 1, wherein the contaminants comprise at least one of colour bodies, fouling agents, or impurities.

9. The process of claim 1, wherein the contaminants are organic.

10. The process of claim 1, further comprising regenerating an ion exchange resin with the second aqueous salt solution.

11. The process of claim 9, further comprising regenerating an ion exchange resin with the second aqueous salt solution.

12. The process of claim 1, further comprising precipitating and separating solids from the recovered liquid.

13. The process of claim 1, further comprising membrane filtering.

14. The process of claim 13, wherein the membrane filtering comprises at least one of filtering the material using membrane filtration or membrane diafiltration.

15. The process of claim 14, wherein a second ion exchange regenerant materialis used for dilution in the membrane diafiltration.

16. The process of claim 14, wherein the second ion exchange regenerant material is ion exchange regenerant material pushed through a resin bed by clean water.

17. The process of claim 16, wherein the oxidizing comprises oxidising the contaminants by adding ozone and/or hypochlorite.

18. The process of claim 1, further comprising oxidizing the contaminants.

* * * * *

UNITED STATES PATENT AND TRADEMARK OFFICE
CERTIFICATE OF CORRECTION

PATENT NO. : 9,682,371 B2  
APPLICATION NO. : 14/367225  
DATED : June 20, 2017  
INVENTOR(S) : Baiada et al.

Page 1 of 1

It is certified that error appears in the above-identified patent and that said Letters Patent is hereby corrected as shown below:

On the Title Page

Item (73), change the Assignee name from:  
GLOBALFOUNDRIES Inc.

To:  
European Sugar Holdings, s.à.r.l.

Signed and Sealed this  
Twentieth Day of February, 2018

Andrei Iancu  
*Director of the United States Patent and Trademark Office*